(12) United States Patent
Shimizu

(10) Patent No.: US 9,332,192 B2
(45) Date of Patent: May 3, 2016

(54) IMAGE GENERATING DEVICE AND EXPOSURE START TIMING ADJUSTMENT METHOD

(71) Applicant: SEIKO EPSON CORPORATION, Tokyo (JP)

(72) Inventor: Satoshi Shimizu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 13/759,284

(22) Filed: Feb. 5, 2013

(65) Prior Publication Data

US 2013/0201364 A1 Aug. 8, 2013

(30) Foreign Application Priority Data

Feb. 7, 2012 (JP) .................................. 2012-023833
Feb. 7, 2012 (JP) .................................. 2012-023834

(51) Int. Cl.
*H04N 5/235* (2006.01)

(52) U.S. Cl.
CPC ................................... *H04N 5/2353* (2013.01)

(58) Field of Classification Search
CPC ... H04N 5/3535; H04N 5/353; H04N 3/1556; H04N 5/2353
USPC ........ 348/221.1, 229.1, 230.1, 294, 295, 296, 348/297, 298, 299, 362, 363, 36, 4, 365, 348/366, 367, 368, 370, 371
See application file for complete search history.

(56) References Cited

U.S. PATENT DOCUMENTS

| | | | | |
|---|---|---|---|---|
| 8,405,762 | B2 * | 3/2013 | Moon ..................... | H04N 5/353 348/222.1 |
| 2004/0218087 | A1 * | 11/2004 | Jazbutis ............... | H04N 5/2353 348/362 |
| 2008/0151087 | A1 * | 6/2008 | Matsumoto .......... | H04N 5/2353 348/296 |
| 2008/0291317 | A1 * | 11/2008 | Endo ..................... | H04N 5/2352 348/340 |
| 2011/0043674 | A1 * | 2/2011 | Takane ................. | H04N 5/2351 348/296 |

FOREIGN PATENT DOCUMENTS

| | | |
|---|---|---|
| JP | 2008-147979 A | 6/2008 |
| JP | 2008-294753 A | 12/2008 |
| JP | 2013-118474 A | 6/2013 |

* cited by examiner

*Primary Examiner* — Twyler Haskins
*Assistant Examiner* — Peter Chon
(74) *Attorney, Agent, or Firm* — Global IP Counselors, LLP

(57) ABSTRACT

An image generating device includes an exposure timing control unit for controlling an electronic front curtain so as to adjust to a running characteristics of a mechanical rear curtain based on a plurality of the image data.

12 Claims, 3 Drawing Sheets

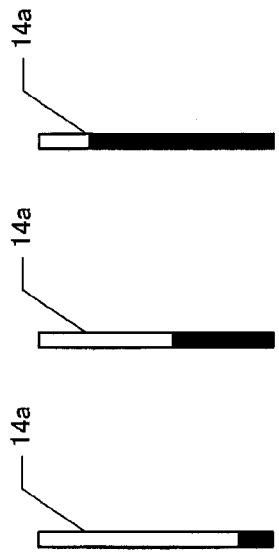
Fig. 2C
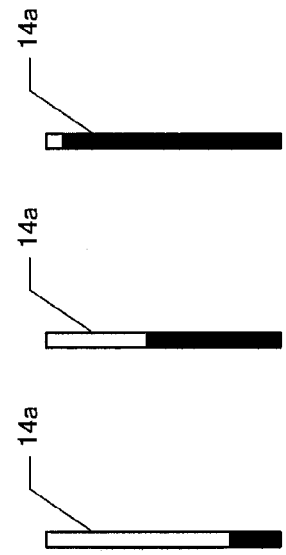
Fig. 2D
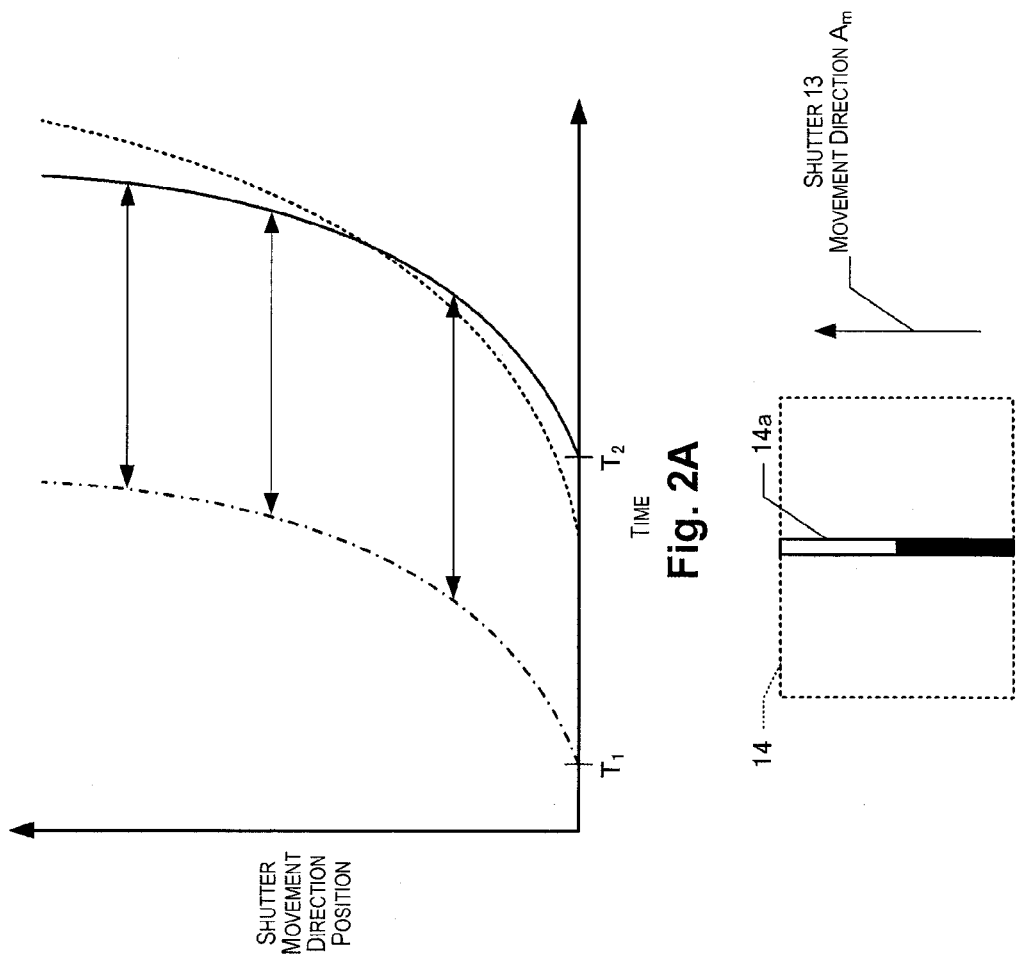
Fig. 2A
Fig. 2B

IMAGE GENERATING DEVICE AND EXPOSURE START TIMING ADJUSTMENT METHOD

CROSS-REFERENCE TO RELATED APPLICATIONS

This application claims priority to Japanese Patent Application No. 2012-023833 filed on Feb. 7, 2012 and Japanese Patent Application No. 2012-023834 filed on Feb. 7, 2012. The entire disclosure of Japanese Patent Application Nos. 2012-023833 and 2012-023834 is hereby incorporated herein by reference.

BACKGROUND

1. Technical Field

The present invention relates to an image generating device and an exposure start timing adjustment method.

2. Background Technology

It has been known from the past that with imaging using a mechanical shutter, the movement volume per unit time of the curtain by the mechanical shutter is not constant. Because of that, with imaging devices with which the front curtain is constituted using an electronic shutter and the rear curtain is constituted using a mechanical shutter, various types of technology have been developed to make the exposure time uniform by adjusting so that the running characteristic of the front curtain using the electronic shutter changes according to the running characteristic of the rear curtain using the mechanical shutter. For example, in Patent Document 1, disclosed is technology with which, to prevent the exposure amount of each position of the light receiving sensor from being uneven due to changes in the lens eye point distance or the like, lens information including the eye point distance of the lens is obtained from the lens unit, and the exposure start timing by the electronic shutter is adjusted based on that lens information.

Japanese Laid-open Patent Publication No. 2008-294753 (Patent Document 1) is an example of the related art.

SUMMARY

Problems to be Solved by the Invention

With the well-known device, it was difficult to appropriately adjust the exposure start timing using the electronic shutter according to various conditions. For example, with the technology of Patent Document 1, to adjust the exposure start timing using the electronic shutter based on the lens information, in a state when it is not possible to obtain lens information (e.g. a state when using another company lens via a conversion lens), performing appropriate exposure start timing using the electronic shutter is difficult. The invention was created taking into consideration the problems noted above, and an advantage is to provide technology capable of making the exposure amount uniform for each light receiving sensor position under various conditions.

Means Used to Solve the Above-Mentioned Problems

With the image generating device of the invention, after starting exposure by performing reset of the light receiving sensor at a designated exposure start timing, it is possible to end exposure by blocking the received light using a shutter, and to generate image data in accordance with the amount of light received by the light receiving sensor from exposure start to end. With this constitution, a plurality of the image data are generated at a plurality of timings for which the positions at which the shutter blocks the light differ according to the movement of the shutter, and the exposure start timing is determined based on that plurality of the image data.

Specifically, with the image generating device of the invention, by actually operating the shutter, and also imaging at different timings in the process of the shutter blocking light, a plurality of image data is generated that indicates the state of light being blocked at different positions by the shutter, and the exposure start timing is determined based on that plurality of image data. Because of that, it is possible to adjust the exposure start timing to match the actually measured shutter operation, making it possible to accurately make the exposure amount uniform for each position of the light receiving sensor.

Furthermore, with the image generating device of the invention, a plurality of image data are generated to determine the exposure start timing by a portion of the plurality of light receiving elements that exist on the light receiving sensor (e.g. the plurality of light receiving elements for which the shutter movement direction positions differ). Specifically, the light blocking by the shutter is typically performed for about several milliseconds (e.g. 3 to 4 milliseconds), and because it is necessary to actually measure the running characteristic of the shutter by generating a plurality of image data indicating the light blocking process of the shutter in a short time period, the shorter the cycle required for obtaining the respective plurality of image data, the larger the number of image data it is possible to generate with a small number of shutter drive processes.

In light of that, the constitution is such that the exposure start timing is adjusted based on image data generated using a portion of the light receiving elements that the light receiving sensor is equipped with. With this constitution, it is possible to generate image data for adjusting the exposure start timing at high speed, making it possible to do imaging with an easy process of the shutter operating at high speed blocking the light. For example, it is possible to easily obtain a plurality of image data by imaging a plurality of times during a one time performance of the operation from the start of light blocking by the shutter until the end of light blocking.

Here, the light receiving sensor is acceptable as long as it is a sensor that receives light and outputs the amount of received light, and for example, it is possible to constitute this using a sensor for which light receiving elements that output information according to the amount of received light are arranged two dimensionally. The shutter is acceptable as long as it is possible to mechanically switch between the blocked state and the not blocked state of the light advancing toward the light receiving sensor, and for example, it is possible to constitute this with a mechanical shutter that moves a curtain provided further to the imaging subject side than the light receiving sensor and blocks light from the imaging subject.

The exposure start control unit is acceptable as long as it is possible to start exposure by performing reset of the light receiving sensor. To adjust the front current running characteristic by controlling the exposure start timing, it is necessary to realize the operation of starting exposure for each line with the light receiving element of the light receiving sensor (with a CMOS sensor, a rolling shutter), but when imaging the image for adjusting the exposure start timing, it is preferable to perform the operation of starting exposure simultaneously for a plurality of light receiving elements.

The image generating unit is acceptable as long as it is able to generate image data according to the amount of received light of the light receiving sensor during the exposure period. Specifically, after exposure is started by the exposure start control unit, it is acceptable as long as it is possible to generate image data according to the light amount received by the light receiving sensor during the time until exposure is ended by the shutter. Of course, it is also possible to execute various types of image processing in association with the generation of that image data.

The exposure start timing control unit is acceptable as long as it is able to give instructions to the exposure start control unit so as to start the exposure of the light receiving sensor at the exposure start timing according to the operation of the shutter blocking the light. Specifically, a plurality of image data showing the state of the light blocked at different positions by the shutter is generated so that the shutter positions differ by the timing at which each image data was imaged, so that plurality of image data shows the operation of the shutter blocking the light. In light of that, by determining the exposure start timing so that exposure of the light receiving element starts at each position of the light receiving sensor at the timing to match that operation, it is sufficient as long as it is possible to adjust the exposure start timing so that the exposure time of each position of the light receiving sensor is even when performing the operation of that shutter blocking the light.

The plurality of image data that becomes the basis for determining the exposure start timing is imaged by a portion of the elements among the plurality of light receiving elements that exist on the light receiving sensor, but that portion of elements is constituted by a plurality of light receiving elements for which the shutter movement direction positions differ. Specifically, with an imaging method that uses both a mechanical shutter and an electronic shutter, the exposure amount becomes uneven along the movement direction of the mechanical shutter, and also, the level of that unevenness fluctuates according to conditions such as the lens type, position, and the like. Therefore, if a constitution is used that images a plurality of image data which become the basis for adjusting the exposure start timing using a plurality of light receiving elements for which the shutter movement direction positions differ, it is possible to generate a plurality of image data which reflects the running characteristic of the shutter along the shutter movement direction, and even if the constitution is such that only a portion of the light receiving elements on the light receiving sensor is used, it is possible to start exposure of the light receiving sensors at the exposure start timing for which the exposure amount was made even for each position according to the running characteristic of the shutter.

Furthermore, as the plurality of image data which become the basis for determining the exposure start timing, it is preferable that they are a plurality of image data for which the shutter shadow edge positions differ. With this constitution, it is possible to specify the running characteristic by which the shutter moves in the movement direction of that shutter as time change characteristics of the shutter shadow edge position by comparing the plurality of image data. Therefore, by adjusting the exposure start timing based on the specified time change characteristics, it is possible to prevent the exposure amount of the light receiving sensor from becoming uneven according to conditions such as lens type, position, and the like.

Furthermore, the exposure start timing is acceptable as long as the exposure amount for each position is adjusted to be even according to the running characteristic of the shutter, and for example, the constitution can be such that the exposure end timing at which the shutter shadow edge reaches each light receiving element on the light receiving sensor is specified based on the plurality of image data, and exposure is started for each light receiving element at the exposure start timing that precedes the exposure end timing by a designated time. Specifically, because there will be a state in which the shadow of that shutter exists on the light receiving element for which light is blocked by the shutter, exposure ends at the light receiving element on the shadow side with the shutter shadow edge on the light receiving sensor as the reference point, and exposure ends at the light receiving element on the side opposite the shadow. Therefore, if the state of the position of the shutter shadow edge changing according to time is specified on the light receiving sensor, this means that the end timing of exposure by the shutter has been specified. In light of that, if the exposure of each light receiving element is started at the exposure start timing that precedes that exposure end timing by a designated time, then it is possible to start exposure at the exposure start timing according to the running characteristic of the shutter. The designated time is acceptable as long as it is the required exposure time, and can be suitably selected according to user settings or the like.

Furthermore, the light receiving elements for generating the plurality of image data for adjusting the exposure start timing are acceptable as long as they are a plurality of light receiving elements for which the shutter movement direction positions differ, and as a constitutional example of that, it is possible to use a constitution that generates the plurality of image data indicating the state of the light being blocked at different positions by the shutter using at least one row of light receiving elements aligned in the shutter movement direction. With this constitution, it is possible to specify the running characteristic of the shutter across the entire area of the imaging region by the light receiving sensor at least for the shutter movement direction. If one row is sufficient for the plurality of light receiving elements, then it is acceptable to generate image data with one row of light receiving elements, but it is also possible to generate image data with a plurality of rows of light receiving elements to perform imaging reliably. Specifically, it is also possible to use a plurality of rows of light receiving elements as long as the plurality of image data can be imaged at high speed.

Furthermore, it is possible to operate the shutter a plurality of times to generate the plurality of image data, and also possible to generate the plurality of image data while operating the shutter a single time, or to combine both of these. For example, it is possible to use a constitution with which the plurality of image data for which the shutter position is different each time is generated at the image generating unit with operation of the shutter N times (N is an integer of 2 or greater), and also, the plurality of image data is generated at the image generating unit so that the position of the shutter at the Nth time is different from the position of the shutter at the N−1th time, so that the exposure start timing is determined based on that plurality of image data. Specifically, the constitution is such that the shutter is operated N times, the plurality of image data is generated each time, and the shutter position is different for all the plurality of image data generated after operation of the shutter N times. With this constitution, it is possible to determine the exposure start timing with high precision according to the shutter operation based on the image data generated by several times of shutter operation.

Furthermore, as with the invention, it is possible to apply as a program or system a method by which the exposure start timing is adjusted based on a plurality of image data imaged by a plurality of light receiving elements which are a portion of the plurality of light receiving elements that exist on the light receiving sensor and for which the shutter movement direction positions differ. Also, there can be cases in which a device, program or method like that described above is realized as a stand-alone device, and are also cases when it is realized using shared parts with a device having composite functions, and this includes various modes.

BRIEF DESCRIPTION OF THE DRAWINGS

Referring now to the attached drawings which form a part of this original disclosure.

FIG. (2A) is a drawing showing the shutter light blocking curtain edge position, the shutter shadow edge position, and the exposure start timing time change characteristics, (2B) is a schematic drawing of a plurality of light receiving elements used when imaging image data, and (2C) and (2D) are explanatory drawings explaining the state of imaging the plurality of image data.

DETAILED DESCRIPTION OF EXEMPLARY EMBODIMENTS

Figure 1:
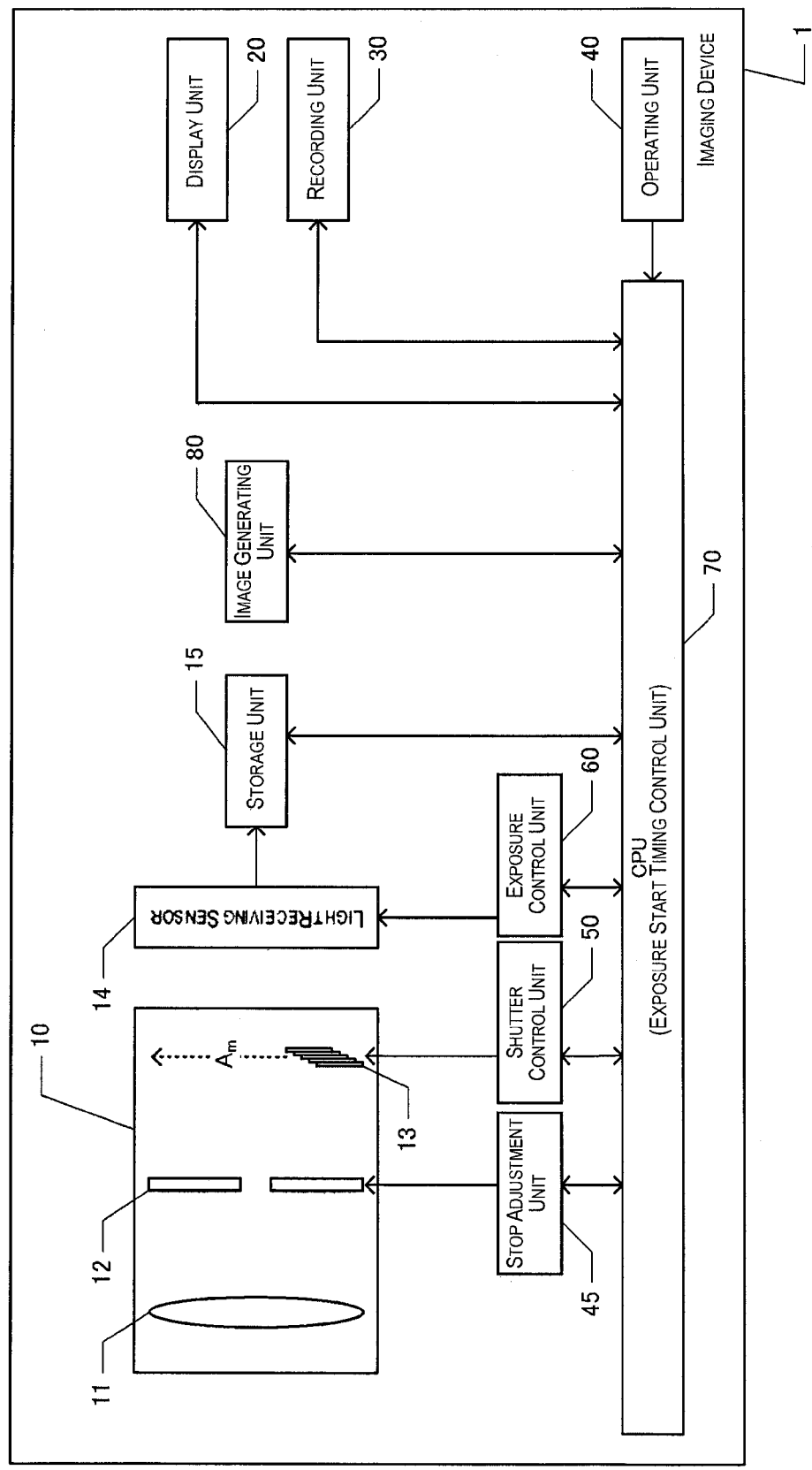
FIG. 1 is a block diagram of a imaging device including the image generating device of an embodiment of the invention.

Here, we will explain embodiments of the invention in the following sequence.
(1) Constitution of the Image Generating Device
(2) Imaging Process
(3) Other Embodiments (1) Constitution of the Image Generating Device FIG. 1 shows a imaging device including the image generating device of an embodiment of the invention, and that imaging device 1 is equipped with an optical system 10, a light receiving sensor 14, a storage unit 15, a display unit 20, a recording unit 30, an operating unit 40, a stop adjustment unit 45, a shutter control unit 50, an exposure control unit 60, a CPU 70, and an image generating unit 80. The CPU 70 follows a designated program to control the operation of the stop adjustment unit 45, the shutter control unit 50, the exposure control unit 60, the storage unit 15, the image generating unit 80, the display unit 20, the recording unit 30, and the operating unit 40.

The optical system 10 is equipped with a lens 11 that forms an image of the imaging subject image on the light receiving sensor 14, a stop 12, and a shutter 13. The lens 11 and the stop 12 with this embodiment are equipped inside a lens barrel, and that lens barrel is interchangeably attached to a case (not illustrated). With this embodiment, the lens 11 includes a plurality of lenses aligned along the direction parallel to the optical axis, but in FIG. 1, this is represented as only one lens for convenience. Each lens is supported by an outer edge part, and by making it possible to move a portion or all of the lenses in the optical axis direction using the focusing ring equipped in the lens barrel, it is possible to adjust the focal point position. Also, by making it possible to move a portion or all of the lenses in the optical axis direction using the zoom ring equipped in the lens barrel, it is possible to perform smooth optical operations. Specifically, this example is in a state for which the manual focus lens is attached to the imaging device 1. For the optical system constitution, another constitution can also be used, for example the lens can be constituted using a liquid lens, and the focal point position can be adjusted by deforming the lens, or the constitution can be such that smooth optical operation is performed.

Also, with this embodiment, the stop 12 is constituted using a plurality of shield plates supported to be able to rotate within the plane perpendicular to the optical axis of the lens 11, and by rotating the plurality of shield plates operating together, it is possible to change the surface area of the part that is not shielded within the plane perpendicular to the optical axis. The aperture diameter of the stop 12 is constituted so as to be controlled by the stop adjustment unit 45, and when that stop adjustment unit 45 gives instructions for the aperture diameter of the stop 12, the stop adjustment unit 45 drives the stop 12 so that it is set to be the instructed aperture diameter.

The shutter 13 is a mechanical focal plane type shutter, and a plurality of open-close type (folding type) light blocking curtains are equipped as the plane shaped light blocking unit parallel to the light receiving sensor surface of the light receiving sensor 14. This light blocking curtain is constituted so as to move in the direction perpendicular to the optical axis according to the control signals from the shutter control unit 50, and normally, the light blocking curtain is held in a state that does not block the light path in the direction parallel to the optical axis. Also, in a state for which the light blocking curtain is held in a state not blocking the light path, when a designated trigger is given, that light blocking curtain is released from the state of being held in a state of not blocking the light path, and the light blocking curtain is in a state for which a plurality of blades driven in the direction perpendicular to the optical axis block the light path.

Specifically, prior to the shutter 13 moving, this is in a non-light blocked state, and through the process of a portion of the light that reaches the light receiving sensor 14 being blocked by the shutter 13, the movement of the shutter 13 is completed to be in a light blocking state. With this embodiment, after being released from the state of being held in a state for which the light blocking curtain of the shutter 13 does not block the light path, the time required until light blocking by that light blocking curtain is completed and the movement of the light blocking curtain is stopped is 3.7 milliseconds. Also, in FIG. 1, the movement direction of the shutter 13 is shown by the dotted line arrow Am.

The light receiving sensor 14 is a CMOS (Complementary Metal Oxide Semiconductor) image sensor equipped with color filters in a Bayer array, and a plurality of light receiving elements (photo diodes) that store charges according to the light amount for each pixel by photoelectric conversion. Of course, the light receiving sensor can also be another sensor such as a CCD (Charge Coupled Device) image sensor or the like. The light receiving sensor 14 of this embodiment is a sensor for which a plurality of light receiving elements are aligned so as to form a rectangle shape, the arrangement is such that the optical axis is positioned at the center of the rectangle, and one side of the rectangle is parallel to the movement direction of the shutter 13 (Am). Also, the other side of that rectangle is perpendicular to the movement direction of the shutter 13 (Am), and is also parallel to the leading part (edge) when the shutter 13 is moving.

With the light receiving sensor 14 of this embodiment, by the exposure control unit 60 performing reset instructions, it is possible to perform a reset operation of resetting the stored charge corresponding to the amount of received light of the light receiving element, and to start exposure with each light receiving element. Also, with the light receiving sensor 14, by the exposure control unit 60 performing read instructions, it is possible to end the exposure by performing reading of the information indicating the amount of received light of the light receiving element. Furthermore, with the light receiving sensor 14, it is possible to control the start and ending of these exposures for each line or for each screen.

Therefore, when imaging an image for recording using the imaging device 1 of this embodiment (normal imaging), the exposure time is controlled by a combination of the shutter 13 which is a mechanical shutter and the electronic shutter of the light receiving sensor 14. Specifically, when doing normal imaging with this embodiment, exposure time is controlled using an electronic front curtain/mechanical rear curtain method by which exposure is started by the electronic shutter with the light receiving sensor 14, and exposure is ended by the shutter 13. In specific terms, when doing normal imaging, exposure is started by the electronic shutter in line sequence, and light blocking by the mechanical shutter is started so that each line has light blocked at a timing for which the exposure time for each line is a set shutter speed. When the exposure time is relatively short, the start of the mechanical shutter operation is before the start of the electronic shutter operation, and from the start of the mechanical shutter operation, the electronic shutter operation starts before blocking of the light that hits the light receiving sensor 14 is started by the mechanical shutter. Also, when imaging image data that will be the basis for adjusting the exposure start timing, midway in the light blocking operation by the mechanical shutter, exposure starts simultaneously by the electronic shutter at the plurality of light receiving elements, and exposure ends by the electronic shutter after a designated time has elapsed. Of course, in addition to these imaging methods, imaging can be performed using various methods according to the application. For example, it is possible to perform live view display on the display unit 20 on the imaging device 1, and when imaging the image to perform that live view display, the exposure time is controlled using the electronic shutter method. Specifically, the front curtain and rear curtain are both controlled using an electronic shutter.

The operating unit 40 is equipped with a shutter button, an operating unit for setting the aperture diameter of the stop 12, an operating unit for setting the shutter speed, an operating unit for operating various types of setting menus, and an operating unit for setting the imaging mode (aperture priority mode and the like), and by performing operations on this operating unit 40, the user can give various instructions to the imaging device 1. With this embodiment, the stroke amount of the shutter button can be detected at two stages. Specifically, it is possible to do detection distinguishing between a state with the shutter button half pressed and a state with it fully pressed. Also, with this embodiment, when the shutter button is half pressed, this is regarded as the instruction for performing imaging preparation having been performed, and when the shutter button is fully pressed, this is regarded as the instruction for recording the image on a recording medium having been performed.

The display unit 20 is equipped with an interface circuit (not illustrated), a liquid crystal panel driver, a liquid crystal panel, an ocular lens (not illustrated) and the like. With this embodiment, the display unit 20 is an EVF (Electronic View Finder) for displaying an image showing the imaging subject as the subject of imaging for the user to grasp information such as the state of the imaging subject before being imaged, the imaging conditions and the like, and the imaging device 1 of this embodiment is a mirrorless digital camera equipped with the EVF.

With the recording unit 30, it is possible to insert a recording medium (not illustrated), and in a state with the recording medium inserted in the recording unit 30, it is possible to record information to the recording medium, or to read information from the recording medium. Specifically, it is possible to record image data showing the imaged image on the recording medium. The storage unit 15 is memory in which image data (information indicating the amount of received light for each light receiving element) output by the light receiving sensor 14 is temporarily recorded.

The image generating unit 80 is constituted by circuits for executing various processes by predetermined procedures on the image data output by the light receiving sensor 14. In specific terms, the image generating unit 80 is equipped with functions of obtaining image data stored in the storage unit 15 by the processing of the CPU 70, performing designated image processing such as y conversion on the image data indicated by that image data, and generating data indicating the image for display and the image for recording. The data indicating the image for display is transferred to the display unit 20, and the photographed image is displayed on the display unit 20. The data indicating the image for recording is transferred to the recording unit 30, and that data is recorded in the recording medium inserted in the recording unit 30.

The process of outputting evaluation values for performing the AE (Automatic Exposure) process is included in the image processing executed by the image generating unit 80. Specifically, the image generating unit 80 specifies an evaluation value (e.g. a brightness average value or the like) for evaluating the brightness of the pixels contained in a designated photometric area set within the imaging range by the light receiving sensor 14, and it is possible to output that as an evaluation value for performing AE processing.

The CPU 70 outputs control signals to the stop adjustment unit 45, the shutter control unit 50, and the exposure control unit 60 based on the evaluation values for performing AE processing, and adjusts the stop 12 aperture diameter and shutter speed so as to achieve a suitable exposure. Specifically, the CPU 70 is equipped with the function of specifying imaging conditions when imaging image data based on the instructions at the operating unit 30 or the default settings, and of setting each unit according to those imaging conditions. In specific terms, the CPU 70 specifies the imaging conditions required for suitable exposure based on the evaluation values for performing the AE processing described above, and outputs control signals to the stop adjustment unit 45, the shutter control unit 50, and the exposure control unit 60 so as to set the stop 12 and the shutter speed according to those imaging conditions. The imaging conditions required to achieve suitable exposure can be specified for various prerequisites (e.g. priority in aperture, in shutter speed, and the like).

Here, the shutter speed indicates the time that light is at the light receiving sensor 14, and the CPU 70 adjusts the exposure start timing for the light receiving sensor 14 so that each line of the light receiving sensor 14 is exposed by the amount of time correlating to that shutter speed. Specifically, with the shutter 13 which is the mechanical shutter, it is not possible to artificially change the running characteristic after movement of the light blocking curtain has started. In light of that, by adjusting the exposure start timing of the light receiving sensor 14, the CPU 70 performs control so that the exposure for each line of that light receiving sensor 14 is constant.

As with this embodiment, when using a imaging method that uses both a mechanical shutter and an electronic shutter, it is known that typically the exposure amount becomes uneven with the movement direction of the mechanical shutter, and that the degree of that unevenness fluctuates according to conditions such as the lens type, position and the like. Specifically, with a imaging method using a mechanical shutter, the light path for which light is blocked by the mechanical shutter changes according to the lens position (focal point position or the like). As a result, there is a change in the time change characteristics for which the position of the edge of the mechanical shutter shadow (light blocked part) changes on the light receiving sensor. On the other hand, with a imaging method using an electronic shutter, since this operates on a light receiving sensor, the position of the edge of the light blocked part does not change according to the lens position (focal point position or the like).

FIG. 2A is a drawing showing an example of the time change characteristics of the edge position of the light blocking curtain of the shutter 13 and the time change characteristics of the edge position of the shadow of the shutter 13, where the horizontal axis is time, and the vertical axis is the position in the shutter movement direction, where dotted lines show the time change characteristics of the edge position of the light blocking curtain of the shutter 13, the solid line shows the time change characteristics of the position of the edge of the shutter 13 shadow, and the dot-dash line shows the time change characteristics of the position at which exposure is started by the electronic shutter. The light blocking curtain of the shutter 13 of this embodiment is driven by a spring (not illustrated), so when the state of being held in a state for which the light path is not blocked by the light blocking curtain is canceled, the speed increases with time, and the position of the edge of the light blocking curtain changes with the time change characteristics as with the quadratic curve shown by the dotted line in FIG. 2A for which the slope becomes sharper with time.

When we compare the position of the edge of the shutter 13 shadow with the position of the edge of the light blocking curtain of the shutter 13 on the light receiving element on the light receiving sensor 14, as shown in FIG. 2A, initially, the position of the edge of the light blocking curtain of the shutter 13 shown by the dotted line is ahead, and the position of the edge of the shutter 13 shadow is behind, but gradually these two are reversed.

Because of that, to control the exposure time of each pixel of the light receiving sensor 14 to be constant, it is necessary to change the exposure start timing to match not the position of the edge of the light blocking curtain of the shutter 13, but rather the change in the position of the edge of the shutter 13 shadow which ends the exposure. In light of that, to control the exposure start timing to match the changes in the position of the edge of the shutter 13 shadow, the CPU 70 measures the time change characteristics of the position of the edge of the shutter 13 shadow before generating the image data for recording, and adjusts the exposure start timing to match those time change characteristics (adjusts the front curtain running characteristic).

With this embodiment, the CPU 70 performs imaging a plurality of image data indicating the light blocked state at different positions of the shutter 13 using a portion of the light receiving elements that the light receiving sensor 14 is equipped with, and uses this as the image for the basis for adjusting the exposure start timing. FIG. 2B is a drawing that schematically shows the plurality of light receiving elements used when imaging the image that will be the basis for adjusting the exposure start timing with this embodiment. In FIG. 2B, the dotted line rectangle indicates the shape looking at the light receiving sensor 14 from the optical axis direction, and the solid line rectangle indicates the plurality of light receiving elements Ma used when imaging the image that is the basis for adjusting the exposure start timing. With this embodiment, the light receiving sensor 14 is a sensor for which the light receiving elements are aligned in a rectangular area, and the plurality of light receiving elements 14a used when imaging the image that will be the basis for adjusting the exposure start timing are constituted by a row of light receiving elements aligned in the short direction of the light receiving sensor 14. Also, the plurality of light receiving elements 14a are arranged at the center in the long direction of the light receiving sensor 14. In FIG. 2B, the width of the light receiving element 14a is emphasized so as to be greater than the actual width. With this embodiment, the short direction of the light receiving sensor 14 is attached to the imaging device 1 so as to be parallel with the movement direction of the shutter 13. Therefore, with this embodiment, a plurality of light receiving elements 14a are constituted by one row of light receiving elements aligned in the movement direction of the shutter 13.

From the state in which the shutter 13 is not blocking the light reaching the light receiving sensor 14, after movement of that shutter 13 starts, in a state in which that shutter 13 is blocking a portion of the light that reaches the light receiving sensor 14 and is not blocking another portion, when image data is imaged by reading the exposure amount from the plurality of light receiving elements 14a when exposure starts for all the elements of the light receiving sensor 14, the image data showing the state of the light being blocked by the shutter 13 is imaged. Specifically, in the process of the shutter 13 blocking the light that reaches the light receiving sensor 14, a state results in which the shadow of the shutter 13 is projected on a portion of the plurality of light receiving elements 14a aligned in the movement direction of the shutter 13, and the shadow of the shutter 13 is not projected on the remaining portion. With the plurality of light receiving elements 14a shown in FIG. 2B, the light receiving elements on which the shadow of the shutter 13 is projected are colored black, and the light receiving elements on which the shadow of the shutter 13 is not projected (light receiving elements which light from the imaging subject reaches) are shown colored white. In such a state, when the image data is imaged, the state is such that exposure has ended at the light receiving elements (the light receiving elements shown in the lower side of FIG. 2B) of the shadow side as the basis point of the shadow edge of the shutter 13, and exposure has not ended at the light receiving elements on the side opposite the shadow (the light receiving elements shown in the upper side of FIG. 2B).

Therefore, when reading is started for all of the plurality of light receiving elements 14a in this state, the exposure at that plurality of light receiving elements 14a ends, and as shown in FIG. 2B, when the edge of the shutter 13 shadow is made to be the boundary, the image is imaged being bright in one region, and dark in the other region. In light of that, with this embodiment, the CPU 70 performs imaging the image data at a plurality of timings for which the position of the edge of the shutter 13 shadow is different, the time change of the position of the edge of the shadow along with the operation of the shutter 13 is estimated based on that image data, and that time change is regarded as the exposure end timing for each line with the light receiving sensor 14.

In this way, to specify the time change of the position of the shadow edge along with the operation of the shutter 13, with this embodiment, the CPU 70 repeats the process of imaging the image data a plurality of times N times (N is an integer of 1 or greater) at designated cycles (e.g. the shortest cycle at which it is possible to perform imaging using the plurality of light receiving elements 14a) in the process of operating the shutter 13 one time. With this embodiment, we are describing this with N as 2 or greater, but when N=1, imaging of the image data is done a plurality of times with one operation of the shutter 13, a plurality of image data is generated, and adjustment of the exposure start timing is performed in the same manner as when N is 2 or greater. When the operation of blocking the light by the shutter 13 is repeated, the CPU 70 does adjustment so that there is a skew between the timing of the imaging timing with the process of operating the shutter 13 the Nth time and the imaging timing with the process of operating the shutter 13 up to the N−1th time, and the imaging timing is controlled so that a plurality of image data is generated in a state with the position of the shadow edge of the shutter 13 being different in the process of repeating N times.

In specific terms, the CPU 70 outputs control signals to the stop adjustment unit 45 so as to open the stop 12 (maximum diameter). As a result, the stop adjustment unit 45 opens the stop 12. Also, the CPU 70 outputs control signals to the shutter control unit 50 so as to have the operation of blocking light performed by the shutter 13. As a result, the state of being held in a state with the light path not being blocked by the light blocking curtain of the shutter 13 is canceled, and the operation of blocking light by the shutter 13 is started. After that operation of the shutter 13 is started, when a predetermined standby time has elapsed, the CPU 70 outputs control signals to the exposure control unit 60 so as to start exposure simultaneously at the plurality of light receiving elements 14*a* which are a portion of the light receiving elements on the light receiving sensor 14. As a result, the exposure control unit 60 performs a reset operation on the plurality of light receiving elements 14*a* of the light receiving sensor 14.

Furthermore, after the reset operation is started on the plurality of light receiving elements 14*a*, after standing by for a designated time, the CPU 70 outputs control signals to the exposure control unit 60, and has image data output to the plurality of light receiving elements 14*a*. Then, the CPU 70 outputs control signals to the exposure control unit 60 so as to repeat start of the exposure and outputting of image data at the plurality of light receiving elements 14*a* at designated cycles. Specifically, with one operation of the shutter 13, image data is imaged a plurality of times at designated cycles by the plurality of light receiving elements 14*a*. With this embodiment, it is also possible for the time required from the start to the end of the light blocking operation by the shutter 13 to be longer than the designated cycle described above. Therefore, with the process of performing the operation of blocking light by that shutter 13, generating of the image data by the plurality of light receiving elements 14*a* is performed a plurality of times.

When the light blocking operation of the shutter 13 is completed, the CPU 70 outputs control signals to the shutter control unit 50 and once again the light blocking curtain of the shutter 13 is held in a state of not blocking the light path. Then, in the process of having the shutter 13 again perform the operation of blocking the light, the process of performing image data generation by the plurality of light receiving elements 14*a* at designated cycles is executed a plurality of times. However, after the light blocking operation by the shutter 13 is started, the standby time described above which is the time until the reset operation for the plurality of light receiving elements 14*a* is started is a time that differs for each shutter 13 operating time number. Specifically, the standby time when performing the first light blocking operation by the shutter 13 is the first standby time, the standby time when performing the second time is the second standby time which is different from the first standby time, and the third standby time from the third time and thereafter is also a time that is different from the prior standby times. Then, the CPU 70 repeats this process until the light blocking operation of the shutter 13 has reached a designated number of times.

As a result of the above processes, a plurality of image data imaged in a state with different positions of the shadow edge of the shutter 13 is generated. FIG. 2C and FIG. 2D are explanatory drawings for describing the state of the plurality of image data being imaged so that the position of the shadow edge of the shutter 13 is made different by the plurality of light receiving elements 14*a*, where FIG. 2C shows the state of imaging the plurality of image data when doing the first operation of the shutter 13, and FIG. 2D shows the state of imaging the plurality of image data when doing the second operation of the shutter 13.

In FIG. 2C and FIG. 2D as well, as with FIG. 2B, the light receiving elements on which the shadow of the shutter 13 is projected are colored black, and the light receiving elements on which the shadow of the shutter 13 is not projected are shown as colored white. As shown in FIG. 2C and FIG. 2D, in the process of the shutter 13 operating once, image data is imaged a plurality of times, and for example when a pixel correlating to the white and black edge positions shown in FIG. 2C are specified, it is possible to specify the state of the edge of the shutter 13 shadow moving in the movement direction of the shutter 13 together with time. Also, the time of imaging the image data can be specified from the state of image data imaging cycle or the like. Therefore, in the time when imaging is not being performed based on FIG. 2C and FIG. 2D, the shutter 3 shadow edge position is interpolated, making it possible to estimate the time change characteristics of the position of the edge of the shutter 13 shadow. The first standby time when imaging with FIG. 2C is different from the second standby time when imaging with FIG. 2D, and because with the example in the drawings, the second standby time is longer, in FIG. 2D, the position of the edge of the shutter 13 shadow is skewed upward from the position shown in FIG. 2C (the shutter 13 movement direction).

When the plurality of image data are generated by the process above, the CPU 70 estimates the state of the changes according to time of the position of the edge of the shutter 13 shadow based on that plurality of image data, and makes it so that the exposure end timing is the same for each element within the lines of the light receiving sensor 14, so it estimates the time shift of the exposure end timing for each line of the light receiving sensor 14. Furthermore, for each line, the CPU 70 determines the exposure start timing of each line so that it precedes that exposure end timing by the time correlating to the shutter speed.

After that, the process moves to the imaging process for generating image data of the imaging subject. Specifically, the CPU 70 outputs control signals to the exposure control unit 60 so that the exposure starts at each line of the light receiving sensor 14 using that exposure start timing. As a result, the exposure control unit 60 performs a reset operation for the light receiving elements of each line so that the exposure starts with the exposure start timing described above. Furthermore, the CPU 70 outputs control signals to the shutter control unit 50, and controls the movement start timing of the shutter 13 so that the exposure ends for each line after a time correlating to the shutter speed has elapsed. As a result, all the light receiving elements on the light receiving sensor 14 perform imaging at almost the same exposure time. Then, when movement of the shutter 13 is completed, an image of the imaging subject is output based on the exposure amount read from the light receiving sensor 14.

With the constitution noted above, the exposure start timing is adjusted based on the plurality of image data which is the plurality of image data imaged in a state for which the shutter positions are different, showing the state with the shutter blocking light at different positions. Because of that, it is possible to adjust the exposure start timing to match the actually measured shutter operation, and it is possible to make the exposure amount even with almost exact precision for each position of the light receiving sensor.

Furthermore, the plurality of image data described above is imaged by the plurality of light receiving elements (the plurality of light receiving elements 14a shown in FIG. 2B) constituted by one row of light receiving elements aligned in the short direction of the light receiving sensor 14. Therefore, compared to a case when an image showing the state of the light being blocked at different positions by the shutter is imaged using all the light receiving elements existing on the light receiving sensor, it is possible to repeat imaging of the image data in very fast cycles. Because of that, even when light blocking by the shutter 13 is completed in a very short period of 3.7 milliseconds as described above, it is possible to generate a plurality of image data during that 3.7 milliseconds.

Also, as with this embodiment, by operating the shutter 13 a plurality of times, and repeating the process of generating the plurality of image data with each operating process, it is possible to generate a large number of image data with a small number of shutter driving processes. Therefore, it is possible to generate a sufficient number of image data to regulate the exposure start timing with high precision by driving the shutter 13 a small number of times. Furthermore, with this embodiment, when operating the shutter 13 a plurality of times, simply by having the standby time described above (first standby time, second standby time and the like) be a different time for each operation, a plurality of image data with different shutter positions is generated. Therefore, it is possible to easily generate a plurality of image data showing the state of the light blocked by the shutter at different positions.

Furthermore, with this embodiment, the time change characteristics of the position of the edge of the shutter 13 shadow is measured by actually operating the shutter 13, so regardless of the conditions, it is possible to adjust the exposure start timing to match the edge of the shutter 13 shadow. Specifically, it is not necessary to obtain lens position information and the like from the lens or the like. Therefore, even when using a lens or the like for which it is not possible to provide lens information to the imaging device 1, it is possible to adjust the exposure start timing to match the edge of the shutter 13 shadow. Furthermore, when the time change characteristics of the position of the edge of the shutter 13 shadow changes with the passage of time, or when it changes according to the ambient temperature, by actually measuring the time change characteristics in the state after the change, it is possible to perform exposure start timing to match the time change characteristics of the position of the edge of the shutter 13 shadow.

(2) Imaging Process

Figure 3:
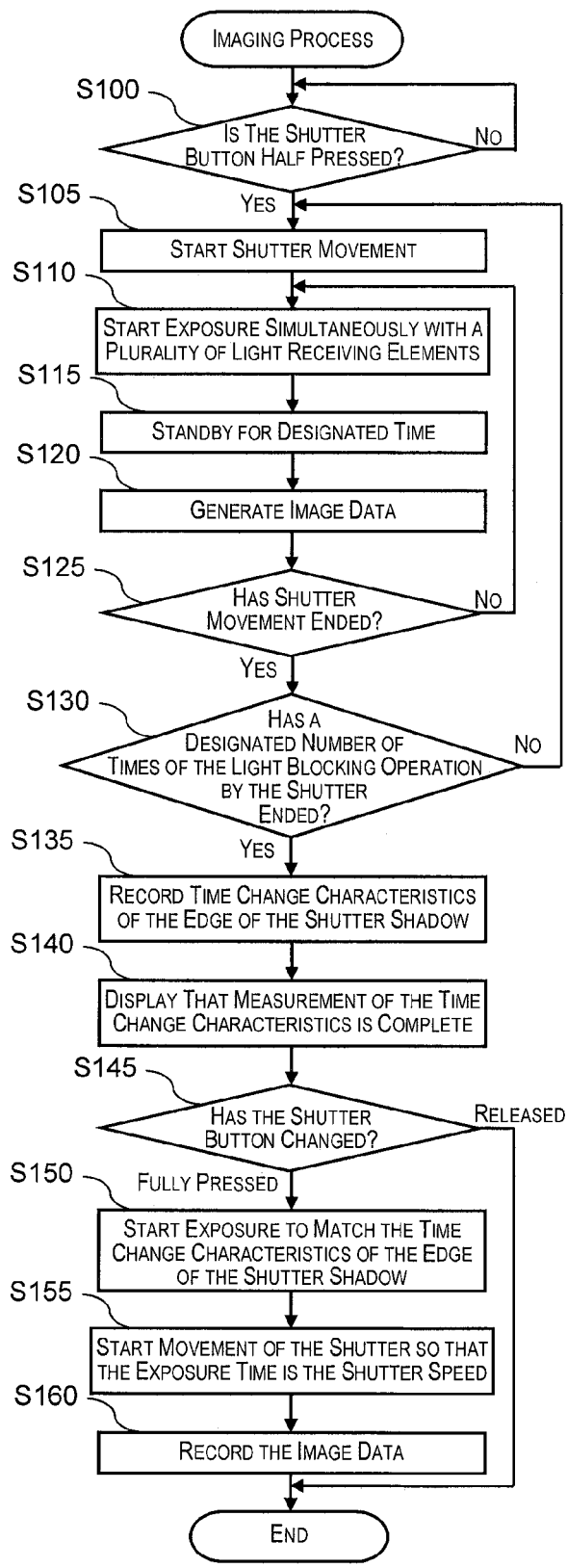
FIG. 3 is a flow chart showing the imaging process.

Next, we will give an example and a detailed description of the imaging process with this embodiment. FIG. 3 is a flow chart of the imaging process. The CPU 70 normally executes processing for performing live view display on the display unit 20. Specifically, the CPU 70 outputs control signals to the exposure control unit 60, and in a state with the front curtain and rear curtain realized using an electronic shutter, evaluation values for performing AE processing generated by the image generating unit 80 are obtained, and the stop 12 aperture diameter and shutter speed are controlled so as to have the exposure when imaging the imaging subject based on that evaluation value be a suitable exposure. In this state, live view display is performed by the CPU 70 displaying the image generated by the image generating unit 80 on the display unit 20.

For example, in the case of aperture priority, the CPU 70 outputs control signals to the stop adjustment unit 45, and has it adjust the aperture diameter so as to be the stop 12 aperture diameter set by the user. Then, the evaluation value for performing AE processing described above obtained in this state is compared with the values in the suitable exposure range, and the shutter speed necessary to make the evaluation value for performing AE processing be a value in the suitable exposure range is specified. Then, the CPU 70 outputs control signals to the exposure control unit 60, and the front curtain and rear curtain of the light receiving sensor 14 are controlled by the electronic shutter so as to have the exposure time match the shutter speed.

In this state, while visually confirming the live view display on the display unit 20, the user adjusts the orientation of the imaging device 1 so that the imaging subject that will be the subject of imaging will be arranged within the visual field, operates the manual focus lens, and adjusts the focal point position and angle of view (degree of zoom). With this embodiment, the constitution is such that by half pressing the shutter button, instructions are performed so as to actually measure the time change characteristics of the edge of the shutter 13 shadow, and with the imaging process shown in FIG. 3, the CPU 70 determines whether or not the shutter button has been half pressed, and goes to standby until it is determined that it has been half pressed (step S100).

With the imaging device 1 of this embodiment, when the already adjusted focal point position and angle of view are changed, it is possible that the time change characteristics of the edge of the shutter 13 shadow can fluctuate. Also, the edge of the shutter 13 shadow can be specified within an image imaged using the light from the imaging subject which is both uniform and bright. Because of that, with this embodiment, after operating the manual focus lens and adjusting the focal point position and angle of view, the regulation is to perform instructions so as to actually measure the time change characteristics of the edge of the shutter shadow with the imaging device 1 aimed at a imaging subject which is both uniform and bright (e.g. a uniformly white imaging subject). In light of this, kept in a state with the focal point position and angle of view already adjusted, the user aims the imaging device 1 at a uniform and bright imaging subject and half presses the shutter button.

At step S100, when it is determined that the shutter button was half pressed, the CPU 70 starts movement of the shutter 13 (step S105). Specifically, the CPU 70 outputs control signals to the shutter control unit 50, and cancels the state of holding in a state for which the light blocking curtain is not blocking the light path. Next, after the standby time described above has elapsed, the CPU 70 starts exposure simultaneously with the plurality of light receiving elements 14a (step S110). Specifically, the CPU 70 outputs control signals to the exposure control unit 60, and performs a reset operation on the plurality of light receiving elements 14a shown in FIG. 2B. As a result, in the process of operating the shutter 13, the state is such that exposure by the plurality of light receiving elements 14a starts.

The standby time at step S110 is the first standby time, the second standby time or the like, and with this embodiment, the length becomes longer as there is an increase in the number of operations of the shutter 13 correlating to the loop count in steps S105 to S130. Also, with this embodiment, the first standby time is set so that the initial imaging is performed immediately after the edge of the shutter 13 shadow has reached the bottom edge of the light receiving sensor 14 (e.g. the state shown in the example furthest to the left in FIG. 2C).

Next, the CPU 70 stands by for a designated time (step S115). Here, the designated time is a fixed time, but it is also possible to have a constitution such that the plurality of image data showing the state of the light blocked at different positions by the shutter 13 are generated as different values with each imaging of that designated time, or with each number of operation of the shutter 13. Next, the CPU 70 generates image data (step S120). Specifically, the CPU 70 outputs control signals to the exposure control unit 60, and exposure is ended by starting simultaneous reading with the plurality of light receiving elements 14a on the light receiving sensor 14. As a result, image data is output to the storage unit 15 from the light receiving sensor 14. For example, with the example shown in FIG. 2C, when image data is first generated with the shutter 13 the first time, the image data shown in the example at the farthest left in FIG. 2C is generated.

Next, the CPU 70 determines whether or not the movement of the shutter 13 has ended (step S125). Specifically, after the state of being held in a state with the light blocking curtain of the shutter 13 not blocking the light path is cancelled, the CPU 70 determines whether the light blocking by the light blocking curtain is completed and the movement of the shutter 13 has stopped. That determination can be performed directly, or it can be performed indirectly. In the former case, for example, it is possible to use a constitution by which a sensor or the like is used to determine that the shutter 13 movement has stopped or the like. In the latter case, for example, it is possible to use a constitution by which after movement of the shutter 13 starts, a determination is made that a designated time (e.g. a predetermined period as the period from when the shutter 13 movement starts until it is completed) has elapsed.

At step S125, when it is not determined that the movement of the shutter 13 has ended, the CPU 70 repeats the process from step S110 and thereafter. As a result, the plurality of image data are generated during performance of one light blocking operation by the shutter 13. Meanwhile, at step S125, when it is determined that the movement of the shutter 13 has ended, the CPU 70 determines whether or not a designated number of times of the light blocking operation by the shutter 13 has ended (step S130). Specifically, it determines whether steps S105 to S125 have been repeated a designated number of times. When it is not determined that a designated number of times of the light blocking operation by the shutter 13 has ended at step S130, the process from the step S105 and thereafter is repeated. Specifically, the CPU 70 outputs control signals to the shutter control unit 50, the state of being held in a state for which the light blocking curtain of the shutter 13 does not block the light path is set again, and movement of the shutter 13 is started again and the edge of the shutter 13 shadow is imaged again.

At step S130, when it is determined that a designated number of times of the light blocking operation by the shutter 13 has ended, the CPU 70 records the information of the time change characteristics of the edge of the shutter 13 shadow in the storage unit 15 (step S135). Specifically, the CPU 70 makes an estimate using the interpolation operation of the movement of the edge of the shutter 13 shadow during the timing for which imaging is performed based on the standby time or the like each time with the process of repeating the light blocking operation by the shutter 13, and estimates the position of the edge of the shutter 13 shadow as a function of time. As a result, the state is the specification of the time change characteristics like those shown by the solid line in FIG. 2A. Of course, here, it is possible to use various constitutions, with which the position along the shutter movement direction can be specified by the coordinates of the pixels on the light receiving sensor 14, or can be specified by the distance from a designated reference position (e.g. the distance from the frame around the light receiving sensor 14).

Next, the CPU 70 outputs control signals to the display unit 20, and makes a display on the display unit 20 to the effect that the measurement of the time change characteristics of the edge of the shutter 13 shadow is completed (step S140). With this embodiment, after the measurement of the time change characteristics of the edge of the shutter 13 shadow is completed, the regulation is to perform the imaging process of the imaging subject by doing a full pressing of the shutter button. In light of that, when the user recognizes by the display at step S140 that measurement of the time change characteristics of the edge of the shutter 13 shadow is completed, the user again aims the imaging device 1 at the imaging subject that will be the subject of imaging when the focal point position and angle of view are adjusted, and does a full press of the shutter button.

The CPU 70 determines whether or not the operation by the user has changed in relation to the shutter button (step S145). Specifically, based on signals from the operating unit 40, the CPU 70 determines whether there has been a change from the state of the shutter button which was half pressed at step S100 to a fully pressed state or a state in which the half pressed state is cancelled. At step S145, when it is determined that there has been a change from the shutter button being in a half pressed state to a released state, the CPU 70 skips the process from step S150 and thereafter and ends the imaging process.

At step S145, when it is determined that there is a change from the state with the shutter button half pressed to a state fully pressed, the CPU 70 starts exposure to match the time change characteristics of the edge of the shutter 13 shadow (step S150). Specifically, the CPU 70 outputs control signals indicating the exposure start timing for each line to the exposure control unit 60, and at the light receiving sensor 14, a rolling shutter operation that starts exposure for each line is executed. At this time, the CPU 70 moves the lines that are subject to exposure start in the movement direction of the shutter 13 on the light receiving sensor 14, and based on the information recorded in the storage unit 15 at step S135, the exposure start timing is controlled so that the time change characteristics of the line position matches the time change characteristics of the edge of the shutter 13 shadow. Specifically, when the time change characteristics of the edge of the shutter 13 shadow are the characteristics indicated by the solid line in FIG. 2A, exposure is started for each line with the time change characteristics like those shown by the dot-dash line in FIG. 2A for which that solid line moved in parallel over time. Of course, with that exposure of each line, exposure starts at the same time for all pixels (all pixels on one line) aligned in the long direction of the light receiving sensor 14. Therefore, when exposure starts at all lines, exposure will be started on the entire surface of the light receiving sensor 14.

Next, the CPU 70 starts movement of the shutter 13 so that the exposure time becomes the shutter speed (step S155). Specifically, the evaluation values for performing AE processing generated by the image generating unit 80 are obtained, and the stop 12 aperture diameter and shutter speed are determined to result in an appropriate exposure for the exposure when imaging the imaging subject based on those evaluation values. Also, the CPU 70 outputs control signals to the stop adjustment unit 45, and controls the stop 12 so as to be that determined aperture diameter.

The CPU 70 outputs control signals to the shutter control unit 50 and starts movement of the shutter 13 so that the time between the timing of exposure of the first line on the light receiving sensor 14 starting (T1 in the example shown in FIG.

2A) and the timing of the edge of the shutter 13 shadow reaching the first line on the light receiving sensor 14 (T2 in the example shown in FIG. 2A) is a timing that matches the shutter speed. Because of that, when the time from the start of movement of the shutter 13 until blocking of the light that reaches the light receiving sensor 14 starts is longer than the shutter speed, movement of the shutter 13 starts before starting exposure. Specifically, the sequence of step S150 and step S155 is reversed. As a result, the time change characteristics of the position of the shadow of the shutter 13 changes as shown by the solid line shown in FIG. 2A, and the time of exposure of each line by the electronic front curtain of the light receiving sensor 14 and the rear curtain of the shutter 13 is fixed and not dependent on the position of the light receiving sensor 14.

When movement of the shutter 13 is completed, the CPU 70 records the image data (step S160). Specifically, the CPU 70 outputs control signals to the exposure control unit 60 and performs reading from all the pixels on the light receiving sensor 14. As a result, the digital values of the exposure amount of all the pixels of the light receiving sensor 14 are output to the storage unit 15 from the light receiving sensor 14, a designated image processing is executed on the digital values output to the storage unit 15, and image data showing the results are recorded in the recording medium inserted in the recording unit 30. With the process noted above, it is possible to perform imaging the imaging subject in a state with the exposure start timing controlled to match the time change characteristics of the edge of the shutter 13 shadow.

(3) Other Embodiments

The embodiment described above is an example of implementing the invention, and as long as the exposure start timing is adjusted based on a plurality of image data imaged by a plurality of light receiving elements which are a portion of the plurality of light receiving elements existing on the light receiving sensor and also have differing positions in the shutter movement direction, it is possible to suitably combine with the modification examples noted below, and to use various other embodiments as well.

For example, with the embodiment described above, the display unit 20 was an EVF using a liquid crystal panel, but the display unit 20 can be a display unit other than an EVF, for example it can be a display unit using a liquid crystal panel attached to the back surface of the imaging device 1, or can be an item using a method other than a liquid crystal panel. Also, the imaging device 1 can be a single lens reflex camera equipped with a mirror, can also be a movie camera, and can also be a device such as a cell phone or the like equipped with an imaging function. Furthermore, with the light receiving sensor 14 described above, the color filter was a Bayer array, but it is also possible to use the invention on an image generating device using a sensor with a constitution of an array other than the Bayer array. For example, it is also possible to use the invention on an image generating device using 3 CCD or a 3 layer type sensor.

Furthermore, with the embodiment described above, a manual focus lens was used, but it is also possible to use a constitution for which an auto focus lens is attached to the imaging device 1, and exposure start timing is adjusted based on a plurality of image data imaged using a plurality of light receiving elements which are a portion of the plurality of light receiving elements that exist on the light receiving sensor and that have different positions in the shutter movement direction. For example, by executing the process from step S105 and thereafter shown in FIG. 3 after the focal point position is adjusted automatically by the auto focus lens, it is possible to generate image data imaged with adjustment of the exposure start timing to match the shutter operating characteristics.

Also, with the embodiment described above, the operation of measuring the time change characteristics of the edge of the shutter 13 shadow starts with a half press of the shutter button, but it is also possible to start it by the user operating another button instead of that, and also possible to operate an actual measurement mode, and to have the user start that mode by doing a full press of the shutter button.

Also, with the embodiment described above, actual measurement was performed using a plurality of light receiving elements (the plurality of light receiving elements 14a shown in FIG. 2B) constituted by one row of light receiving elements aligned in the short direction of the light receiving sensor 14, but this is not restricted to that, and it is also possible to use other light receiving elements such as by performing actual measurement using light receiving elements of a plurality of rows with different positions of the long direction of the light receiving sensor 14.

Also, with the embodiment described above, imaging was performed for actual measurement of the time from the start of movement by the shutter 13 at a different timing from when imaging for actual measurement when it is the movement of the shutter 13 up to then, but in addition to this, it is also possible to perform imaging for actual measurement of the time from the start of the movement of the shutter 13 at the same timing as when imaging for actual measurement when it is the movement of the shutter 13 up to then.

It is also possible to generate the plurality of image data by repeating a plurality of times the generating of one image data with one shutter 13 operation.

What is claimed is:

1. An image generating device, comprising:
    a light receiving sensor including a plurality of light receiving elements for receiving light that has passed through a lens;
    a shutter for blocking the light that reaches the light receiving sensor;
    an exposure start control unit for starting exposure by performing reset of the light receiving sensor at a designated exposure start timing;
    an image generating unit for generating image data according to the amount of light received by the light receiving sensor from when exposure starts until it ends; and
    an exposure start timing control unit for generating a plurality of the image data at a plurality of timings during movement of the shutter while the movement of the shutter is executed one or more times, and for determining the exposure start timing based on the plurality of the image data, each of the plurality of the image data including a plurality of pixels corresponding to the plurality of the light receiving elements, wherein
    the exposure start timing control unit generates each of the plurality of image data by simultaneously reading exposure amounts from the plurality of the light receiving elements including the light receiving element on which a shutter shadow is projected and the light receiving element on which the shutter shadow is not projected.

2. The image generating device according to claim 1, wherein
    the exposure start timing control unit specifies the exposure end timing at which an edge of the shutter shadow reaches each light receiving element on the light receiving sensor based on the plurality of image data, and starts the exposure at each light receiving element at the exposure start timing preceding the exposure end timing by a designated time.

3. The image generating device according to claim 2, wherein
the exposure start timing control unit generates the plurality of image data based on the amount of light received by at least one row of light receiving elements aligned in the movement direction of the shutter.

4. The image generating device according to claim 3, wherein
the exposure start timing control unit operates the shutter N times (N is an integer of 2 or greater), generates a plurality of the image data for which the position of the shutter is different each time at the image generating unit, and determines the exposure start timing based on that plurality of the image data.

5. The image generating device according to claim 4, wherein
the exposure start timing control unit, at the Nth time, generates at least one of the image data for which the position of the shutter is different from the position of the shutter up to the N−1th time, and determines the exposure start timing based on the plurality of the image data generated by the image generating unit.

6. The image generating device according to claim 1, wherein
the exposure start timing control unit controls the light receiving sensor such that exposure periods of the light receiving sensor for generating the plurality of image data do not overlap each other.

7. The image generating device according to claim 1, wherein
the exposure start timing control unit generates at least one image data during each movement of the shutter while the movement of the shutter is executed multiple times.

8. An exposure start timing adjustment method for an image generating device comprising:
a light receiving sensor including a plurality of light receiving elements for receiving light that has passed through a lens;
a shutter for blocking the light that reaches the light receiving sensor;
an exposure start control unit for starting exposure by performing reset of the light receiving sensor at a designated exposure start timing;
an image generating unit for generating image data according to the amount of light received by the light receiving sensor from when exposure starts until it ends; and
wherein with the exposure start timing adjustment method, a plurality of the image data is generated at a plurality of timings during movement of the shutter while the movement of the shutter is executed one or more times, and the exposure start timing is determined based on that plurality of the image data, each of the plurality of the image data including a plurality of pixels corresponding to the plurality of the light receiving elements, and
each of the plurality of image data is generated by simultaneously reading exposure amounts from the plurality of the light receiving elements including the light receiving element on which a shutter shadow is projected and the light receiving element on which the shutter shadow is not projected.

9. An image generating device, comprising:
a light receiving sensor including a plurality of light receiving elements for receiving light that has passed through a lens;
an electronic front curtain of the light receiving sensor;
a mechanical rear curtain for blocking the light that reaches the light receiving sensor;
an image generating unit for generating image data according to the amount of light received by the light receiving sensor; and
an exposure timing control unit for controlling the electronic front curtain so as to adjust to a running characteristics of the mechanical rear curtain based on a plurality of the image data generated based on detection results by the light receiving sensor during movement of the mechanical rear curtain, each of the plurality of the image data including a plurality of pixels corresponding to the plurality of the light receiving elements, wherein
the exposure start timing control unit generates each of the plurality of image data by simultaneously reading exposure amounts from the plurality of the light receiving elements including the light receiving element on which a shadow of the mechanical rear curtain is projected and the light receiving element on which the shadow of the mechanical rear curtain is not projected.

10. An image generating device, comprising:
a light receiving sensor including a plurality of light receiving elements for receiving light that has passed through a lens;
a shutter for blocking the light that reaches the light receiving sensor;
an exposure start control unit for starting exposure by performing reset of the light receiving sensor at a designated exposure start timing;
an image generating unit for generating image data according to the amount of light received by the light receiving sensor from when exposure starts until it ends; and
an exposure start timing control unit for generating a plurality of the image data by resetting the light receiving sensor at a plurality of timings occurring after movement of the shutter has started with the movement of the shutter being executed one or more times, and for determining the exposure start timing based on the plurality of the image data, each of the plurality of the image data including a plurality of pixels corresponding to the plurality of the light receiving elements, wherein
the exposure start timing control unit generates each of the plurality of image data by simultaneously reading exposure amounts from the plurality of the light receiving elements including the light receiving element on which a shadow of the shutter is projected and the light receiving element on which the shadow of the shutter is not projected.

11. The image generating device according to claim 10, wherein
the exposure start timing control unit controls the light receiving sensor such that exposure periods of the light receiving sensor for generating the plurality of image data do not overlap each other.

12. The image generating device according to claim 10, wherein
the exposure start timing control unit generates at least one image data during each movement of the shutter while the movement of the shutter is executed multiple times.

* * * * *